(12) United States Patent
Gao

(10) Patent No.: US 9,688,894 B2
(45) Date of Patent: Jun. 27, 2017

(54) COMPOSITIONS FOR PREVENTION OF ICE BUILD-UP

(71) Applicant: UNIVERSITY OF PITTSBURGH—OF THE COMMONWEALTH SYSTEM OF HIGHER EDUCATION, Pittsburgh, PA (US)

(72) Inventor: Di Gao, Wexford, PA (US)

(73) Assignee: University of Pittsburgh—Of The Commonwealth System of Higher Education, Pittsburgh, PA (US)

(*) Notice: Subject to any disclaimer, the term of this patent is extended or adjusted under 35 U.S.C. 154(b) by 0 days.

(21) Appl. No.: 14/764,877

(22) PCT Filed: Jan. 30, 2014

(86) PCT No.: PCT/US2014/013917
§ 371 (c)(1),
(2) Date: Jul. 30, 2015

(87) PCT Pub. No.: WO2014/120961
PCT Pub. Date: Aug. 7, 2014

(65) Prior Publication Data
US 2015/0361319 A1 Dec. 17, 2015

Related U.S. Application Data

(60) Provisional application No. 61/758,442, filed on Jan. 30, 2013.

(51) Int. Cl.
| | | |
|---|---|---|
| *C09K 3/18* | (2006.01) | |
| *C09D 183/04* | (2006.01) | |
| *C08L 83/04* | (2006.01) | |
| *C08G 77/16* | (2006.01) | |
| *C08G 77/24* | (2006.01) | |

(52) U.S. Cl.
CPC .............. *C09K 3/18* (2013.01); *C09D 183/04* (2013.01); *C08G 77/16* (2013.01); *C08G 77/24* (2013.01); *C08L 83/04* (2013.01)

(58) Field of Classification Search
CPC .................................. C09K 3/18; C08L 83/04
USPC ......... 524/261–268, 588; 106/287.1–287.16; 428/447–452
See application file for complete search history.

(56) References Cited

U.S. PATENT DOCUMENTS

| | | | |
|---|---|---|---|
| 4,774,112 A | 9/1988 | Achtenberg | |
| 5,187,015 A | 2/1993 | Yorkgitis | |
| 6,169,155 B1* | 1/2001 | Alvarez | C08L 83/04 524/268 |
| 7,754,800 B2* | 7/2010 | Maton | C08G 77/14 524/423 |
| 2006/0281861 A1 | 12/2006 | Putnam | |
| 2007/0178321 A1* | 8/2007 | Haas | C09D 183/04 428/447 |
| 2007/0281097 A1* | 12/2007 | Ikeno | C08L 83/04 427/387 |
| 2008/0286473 A1 | 11/2008 | Smith | |
| 2011/0143148 A1 | 6/2011 | Butts | |
| 2012/0156052 A1 | 6/2012 | Richards | |

FOREIGN PATENT DOCUMENTS

WO  WO 8808018  10/1988

OTHER PUBLICATIONS

Form PCT/ISA/220, PCT Notification of Transmittal of the International Search Report and the Written Opinion of the International Search Authority, or the Declaration, PCT/US2014/013917, Date Mailed May 13, 2014.
Form PCT/ISA/210, PCT International Search Report for International Application No. PCT/US2014/013917, Date Mailed May 13, 2014.
Form PCT/ISA/237, PCT Written Opinion of the International Searching Authority for International Application No. PCT/US2014/013917, Date Mailed May 13, 2014.

* cited by examiner

*Primary Examiner* — Marc Zimmer
(74) *Attorney, Agent, or Firm* — Paul D Bangor, Jr.; Clark Hill, PLC

(57) ABSTRACT

A composition comprising a silicone oil or fluorosilicone fluid infused in a cross-linked silicone resin matrix. The silicone oil or fluorosilicone fluid may comprise a linear or branched polymeric siloxane that may be functionalized with one or more of: alkyl, fluoroalkyl, aryl, benzyl, halo, hydride, hydroxyl, -alkyl-OH, -alkyl-SH, halo, -aryl-halogen, -alkyl-COOH, -alkyl(COOH)-alkyl-COO-alkyl, alkenyl, vinyl, -alkyl-acryloyl, -alkylamino, -alkyl-NH-alkyl-NH2, -alkyl-OOC-NH-alkyl-NCO, -alkyl-O-oxiranyl, monofluoromethyl, difluoromethyl, trifluoromethyl, or alkeneoxide co-polymer.

1 Claim, 2 Drawing Sheets

US 9,688,894 B2

COMPOSITIONS FOR PREVENTION OF ICE BUILD-UP

RELATED APPLICATIONS

This application claims priority benefit under 35 U.S.C. §119(e) of U.S. Provisional Application No. 61/758,442, filed Jan. 30, 2013 the contents of which are herein incorporated by reference.

FIELD

The present disclosure is related generally to compositions for prevention of ice build-up on a surface.

BACKGROUND INFORMATION

Icing in a cold environment causes many problems, including glazing rotors and blades of wind turbines, breaking power lines, and stalling airfoil of aircrafts. Most of these problems are due to build-up of ice on surfaces. Such ice build-up may be removed by heating, by applying chemicals that reduce the melting point of ice, by applying a mechanical force (such as shock or vibration), or by occluding air to break the bonding between ice and the substrate surface. However, all of these methods have limitations and disadvantages. An alternative method to prevent ice build-up is to protect the surface with a coating that has an ultra-low ice adhesion strength (i.e., ice barely adheres to the coating), so that ice formed on such a coating can be released by the weight of ice alone when the substrate surface is slightly inclined from horizontal or by a very small shear force applied to the ice (e.g., by spinning of the blade of a wind turbine or by flowing of air over the surface).

Many approaches have been explored to make coatings for prevention of ice build-up, for example, by using coatings with a low surface free energy (such as silicone resins, fluorinated polymers, polyethylene, hydrophobic polyurethanes, epoxies, etc.), and by tuning the surface texture and roughness of the coating to reduce the contact area between ice and the substrate and/or to induce cracking of ice. In general, coatings made by following these approaches are able to significantly reduce the ice adhesion strength to substrates, sometimes by an order of magnitude or more, and consequently, ice may be released considerably easier from these coatings than from uncoated conventional substrates such glass, metals, and concrete. However, the ice adhesion strength on these coatings, even though significantly smaller than on uncoated substrates, is still too strong to satisfy the need of many industrial applications, and spontaneous ice release is still impossible in most circumstances. In quantitative terms, the shear stress that is required to release ice from these substrates (at about −20° C.) is in the order of 10-100 kPa, compared to the order of 100-1000 kPa for ice adhesion to uncoated metal and glass; however, the shear stress for ice release needs to be smaller than 10 kPa for spontaneous ice release in many applications. In some circumstances, ice adhesion strength is characterized by a cohesive strength in terms of adhesion energy per contact area, in which case it is generally believed that adhesion strength in the order of 0.1 J/m$^2$ is required for spontaneous ice release. Heretofore, no viable technology has been able to produce coatings with such low ice adhesion strength.

Most recently, superhydrophobic surfaces have been used to prevent ice formation and to reduce ice adhesion on substrates. These surfaces show remarkable water repellency, characterized by a water contact angle of higher than 150°, which has been explained by the interplay between the surface chemical composition and the surface texture with a two-tier roughness in micrometer and nanometer scales, respectively, for each tier. Although some promising experimental results have been demonstrated which indicate that superhydrophobic surfaces may prevent ice formation and reduce ice adhesion strength in certain circumstances, it has been found that the superhydrophobicity of these surfaces is completely removed and ice adheres strongly to the substrates when condensation occurs before or with icing.

Thus, there remains a considerable need for ice release compositions for use as or in coatings, paints and the like for a wide range of surfaces and applications that provide ice adhesion strengths smaller than 10 kPa for spontaneous or easy ice release.

SUMMARY OF THE DISCLOSURE

In a preferred aspect, the present disclosure is directed to compositions for prevention of ice buildup comprising a silicone oil or fluorosilicone fluid combined with a cross-linked silicone resins. The silicone resin forms a cross-linked polymer matrix, and the silicone oil or fluorosilicone fluid is embedded within the cross-linked polymer matrix of the silicone resin. When the viscosity of the silicone oil or fluorosilicone fluid is within a defined range and the silicone oil or fluorosilicone fluid and the silicone resin are mixed at a weight ratio within a defined range, the cross-linked polymer matrix of the silicone resin serves as a storage place for the silicone oil or fluorosilicone fluid, and the silicone oil or fluorosilicone fluid is released (or leached) gradually out of the cross-linked polymer matrix over time, thereby constantly forming a thin layer of oil on the surface of the coatings. This thin layer of silicone oil serves as a lubricant between ice and the substrate. Therefore, the adhesion strength between ice and the substrate is extremely low, and ice may slip off the coating by the weight of the ice alone when the substrate surface is slightly inclined from horizontal or by applying a very small force to the ice (e.g. by spinning the blade of a wind turbine or by flowing air over the substrate surface). With correct combination of the cross-linked silicone resin and the silicone oil or fluorosilicone fluid, this oil release (or leaching) mechanism can last many years, and the ice release coatings made through this approach can remain effective in preventing ice from building up on a substrate over many years in a natural environment.

In another preferred aspect, the composition of the present disclosure comprises a silicone oil or fluorosilicone fluid infused in a cross-linked silicone resin matrix. Preferably, the weight ratio of the silicone oil or fluorosilicone fluid to silicone resin is 1-20:1, more preferably 1-10:1 and still more preferably 2-8:1.

In a further preferred aspect of the composition of the present disclosure, the silicone oil or fluorosilicone fluid may comprise a linear polymeric siloxane.

In another preferred aspect of the composition of the present disclosure, the silicone oil or fluorosilicone fluid preferably has a viscosity ranging from about 2 cP to about 300,000 cP, more preferably from about 10 cP to about 10,000 cP and still more preferably from about 50 cP to about 500 cP.

In a further preferred aspect, the composition of the present disclosure comprises, by weight, 75% polydimethylsiloxane (PDMS) and 25% silicone resin matrix. Preferably, the PDMS may have a dynamic viscosity of 200 cP and the silicone resin matrix comprises a three dimensional polymer matrix comprising a trifunctional siloxane cross-linked with one or more other trifunctional siloxanes or difunctional siloxanes.

In a further preferred aspect of the composition of the present disclosure, the silicone oil or fluorosilicone fluid may comprise a copolymer of siloxane or a linear copolymer of siloxane.

In another preferred aspect of the composition of the present disclosure, the silicone oil or fluorosilicone fluid may comprise a branched silicone.

In a further preferred aspect of the composition of the present disclosure, the silicone oil or fluorosilicone fluid may comprise a cyclic siloxane.

In yet a further preferred aspect of the composition of the present disclosure, the silicone oil or fluorosilicone fluid may comprise a linear or branched polymeric siloxane functionalized with one or more of the following groups: alkyl, fluoroalkyl, aryl, benzyl, halo, hydride, hydroxyl, -alkyl-OH, -alkyl-SH, halo, -aryl-halogen, -alkyl-COOH, -alkyl(COOH)-alkyl-COO-alkyl, alkenyl, vinyl, -alkyl-acryloyl, -alkylamino, -alkyl-NH-alkyl-NH2, -alkyl-OOC—NH-alkyl-NCO, -alkyl-O-oxiranyl, monofluoromethyl, difluoromethyl, trifluoromethyl, or alkeneoxide co-polymer.

In a further preferred aspect, the composition of the present disclosure comprises a silicone oil or fluorosilicone fluid infused in a cross-linked silicone resin matrix and may additionally comprise one or more of a group consisting of a paint, a liquid coating, a solid coating, silicone oil or fluorosilicone fluid encapsulated in vesicles, an alcohol, an ester, an ether, a ketone, an ether-alcohol, an aromatic hydrocarbon, an aliphatic hydrocarbon, a halogenated hydrocarbon, and a volatile silicone.

BRIEF DESCRIPTION OF THE DRAWINGS

For the present disclosure to be easily understood and readily practiced, the disclosure will now be described, for the purposes of illustration and not limitation, in conjunction with the following figures, wherein.

DETAILED DESCRIPTION OF PREFERRED EMBODIMENTS

Figure 1:
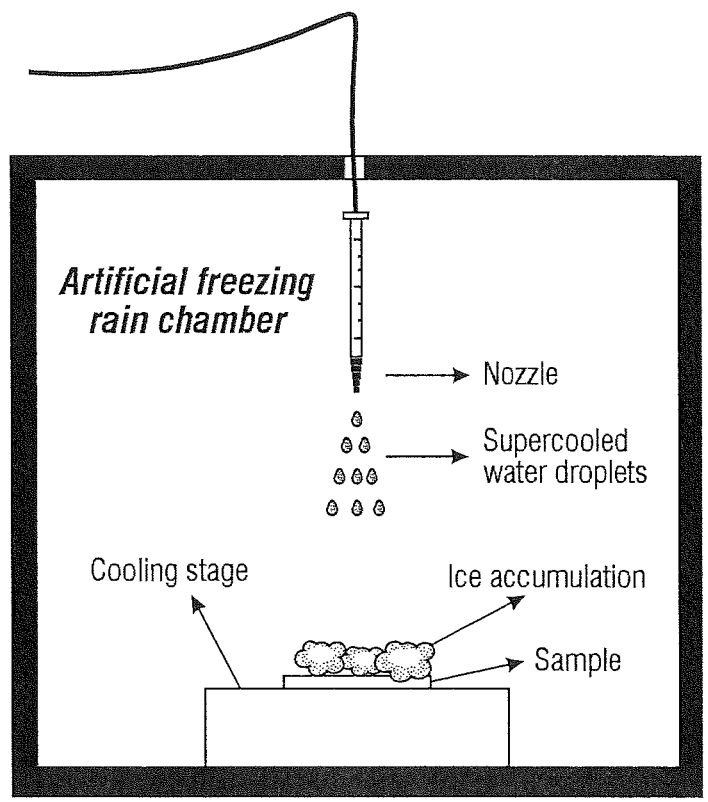
FIG. 1 is a schematic of the artificial freezing rain chamber used in the Examples to evaluate the ice release coatings.

As used herein in the specification and claims, including as used in the examples and unless otherwise expressly specified, all numbers may be read as if prefaced by the word "about", even if the term does not expressly appear. Also, any numerical range recited herein is intended to include all sub-ranges subsumed therein.

The present disclosure is directed to ice release coatings whose preferred composition comprises silicone oil or fluorosilicone fluid and a cross-linked silicone resin. Other components may be added to the coating formula, for example, to aid the application of the coating to various substrates, to improve the ultra-violet (UV) resistance, and to change the appearance of the coating. These components include solvents, flow additives, UV blockers, pigments and particles, and organic dyes. They are known to those skilled in the art, and can be added to the coating formula either individually or in combination with each other as long as they do not change the function of the silicone oil or fluorosilicone fluid and the silicone resin used in the ice release coating. The following describes the molecular structure and the properties of the two key components used in the ice release coating: (i) silicone oil or fluorosilicone fluid and (ii) silicone resin.

Silicone Oil or Fluorosilicone Fluid

In a preferred embodiment of the present disclosure, the kinematic viscosity of the silicone oil or fluorosilicone fluid used in the ice release coating ranges from 2 to 300,000 centistokes (cSt, or 106 m$^2$/s), preferably from 10 to 50,000 cSt, and more preferably from 300 to 10,000 cSt. The dynamic viscosity of the silicone oil ranges from 2 to 300,000 centiPoise (cP, or 10$^{-3}$ Pa·s), preferably from 10 to 50,000 cP, and more preferably from 300 to 10,000 cP.

The silicone oil used in the ice release coating preferably may be a linear polymeric siloxane of the following general structure I, where R is an organo group such as $C_1$-$C_5$ alkyl (e.g. methyl, ethyl, vinyl) and $C_6$ aryl (e.g. phenyl), and n ranges from 1 to 50,000, preferably from 50 to 1,000. The dynamic viscosity of the silicone oil ranges from 2 to 300,000 centiPoise (cP, or 10$^{-3}$ Pa·s), preferably from 10 to 50,000 cP, and more preferably from 300 to 10,000 cP. Such silicone oils are commercially available from companies such as Dow Corning, Wacker-Chemie, and Union Carbide. Particularly, when R in Structure I is a methyl group, the molecule is known as polydimethylsiloxane (PDMS). PDMS with various molecular weight and various viscosity is commercially available from companies such as Dow Corning, Wacker-Chemie, and Union Carbide.

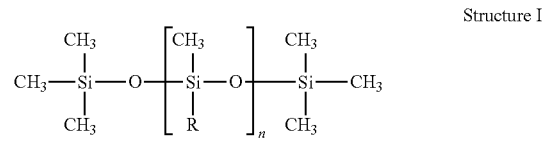

Structure I

The silicone oil used in the ice release coating preferably may also be a linear polymeric siloxane with functionalized end groups as shown in the following general structure II, where $R_1$ and $R_2$ can be the same or different, chosen from $C_1$-$C_5$ alkyl, phenyl, benzyl, halide, hydride, fluoroalkyl [—$CF_3$], [—$CHF_2$], [—$(CH_2)F$], hydroxyl [—$(CH_2)_3H$], mercapto [—$(CH_2)_3SH$], halo [—$C_6H_4Cl$], carboxyl such as [—$(CH_2)_3$—CH(COOH)—$CH_2$—COO-alkyl], alkenyl such as [—CH=$CH_2$] and [—$(CH_2)_3$—OOC—CH=$CH_2$], amino such as [—$(CH_2)_3$—NH—$CH_2CH_2NH_2$], isocyano such as [—$(CH_2)_3$—OOC—NH—$(CH_2)_4$—N=C=O], epoxy such as [—$(CH_2)_3$—O—$H_2CH(O)CH_2$], or alkene oxide copolymer such as [—$(CH_2)_3$—$(CH_2CH_2O)_x$—$(CH_2CH(CH_3)O)_yH$], and n ranges from 1 to 50,000, preferably from 50 to 1,000. The dynamic viscosity of the silicone oil ranges from 2 to 300,000 centiPoise (cP, or 10$^{-3}$ Pa·s), preferably from 10 to 50,000 cP, and more preferably from 300 to 10,000 cP. Silicone oils with some of these structures are commercially available from companies such as Dow Corning, Wacker-Chemie, and Union Carbide.

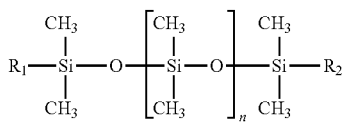

Structure II

More generally, the silicone oil used in the ice release coating preferably may also be a linear polymeric siloxane with the following general structure III (which is a more general structure of Structures I and II), where $R_1$, $R_2$, $R_3$, $R_4$, $R_5$, $R_6$, $R_7$, and $R_8$ can be chosen from $C_1$-$C_5$ alkyl, phenyl, benzyl, halide, hydride, fluoroalkyl [—$CF_3$], [—$CHF_2$], [—$CH_2F$], hydroxyl [—$(CH_2)_3H$], mercapto [—$(CH_2)_3SH$], halo [—$CH_4Cl$], carboxyl such as [—$(CH_2)_3$—$CH(COOH)$—$CH_2$—$COO$-alkyl], alkenyl such as [—$CH=CH_2$] and [—$(CH_2)_3$—$OOC$—$CH=CH_2$], amino such as [—$(CH_2)_3$—$NH$—$CH_2CH_2$—$NH_2$], isocyano such as [—$(CH_2)_3$—$OOC$—$NH$—$(CH_2)_4$—$N=C=O$], epoxy such as [—$(CH_2)_3$—$O$—$CH_2CH(O)CH_2$], or alkene oxide copolymer such as [—$(CH_2)_3$—$O$—$(CH_2CH_2O)_x$—$(CH_2CH(CH_3)O)_yH$], and n (in Structure III) ranges from 1 to 50,000, preferably from 50 to 1,000. The dynamic viscosity of the silicone oil ranges from 2 to 300,000 centiPoise (cP, or $10^{-3}$ Pa·s), preferably from 10 to 50,000 cP, and more preferably from 300 to 10,000 cP.

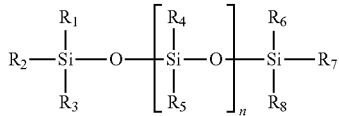

Structure III

The silicone oil used in the ice release coating preferably may also be a copolymer of siloxane with the following general structure IV, where R can be chosen from $C_1$-$C_5$ alkyl, phenyl, benzyl, halide, hydride, fluoroalkyl [—$CF_3$], [—$CHF_2$], [—$CH_2F$], hydroxyl [—$(CH_2)_3H$], mercapto [—$(CH_2)_3SH$], halo [—$CH_4C$], carboxyl such as [—$(CH_2)$—$CH(COOH)$—$CH_2$—$COO$-alkyl], alkenyl such as [—$CH=CH_2$] and [—$(CH_2)_3$—$OOC$—$CH=CH_2$], amino such as [—$(CH_2)_3$—$NH$—$CH_2CH_2$—$NH_2$], isocyano such as [—$(CH_2)$—$OOC$—$NH$—$(CH_2)_4$—$N=C=O$], epoxy such as [—$(CH_2)_3$—$CH_2CH(O)CH_2$], or alkene oxide copolymer such as [—$(CH_2)$—$(CH_2CH_2O)_x$—$(CH_2CH(CH)O)_yH$], and m (in Structure IV) ranges from 1 to 1000, preferably from 2 to 100, and more preferably from 2 to 30, and n (in Structure IV) ranges from 1 to 5,000, preferably from 20 to 1,000. The dynamic viscosity of the silicone oil ranges from 2 to 300,000 centiPoise (cP, or $10^{-3}$ Pa·s), preferably from 10 to 50,000 cP, and more preferably from 300 to 10,000 cP. Such silicone oils are commercially available from companies such as Dow Corning, Wacker-Chemie, and Union Carbide.

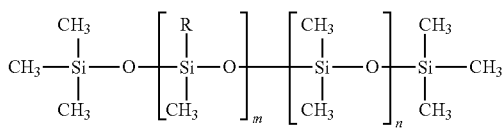

Structure IV

The silicone oil used in the ice release coating preferably may also be a linear copolymer of siloxane with the following general structure V (which is a more general structure of Structure IV), where $R_1$, $R_2$, $R_3$, $R_4$, $R_5$, $R_6$, $R_7$, $R_8$, $R_9$, and $R_{10}$ can be chosen from $C_1$-$C_5$ alkyl, phenyl, benzyl, halide, hydride, fluoroalkyl [—$CF_3$], [—$CHF_2$], [—$CH_2F$], hydroxyl [—$(CH_2)_3H$], mercapto [—$(CH_2)_3SH$], halo [—$C_6H_4Cl$], carboxyl such as [—$(CH_2)_3$—$CH(COOH)$—$CH_2$—$COO$-alkyl], alkenyl such as [—$CH=CH_2$] and [—$(CH_2)_3$—$OOC$—$CH=CH_2$], amino such as [—$(CH_2)_3$—$NH$—$CH_2CH_2$—$NH_2$], isocyano such as [—$(CH_2)_3$—$OOC$—$NH$—$(CH_2)_4$—$N=C=O$], epoxy such as [—$(CH_2)_3$—$O$—$CH_2CH(O)CH_2$], or alkene oxide copolymer such as [—$(CH_2)_3$—$O$—$(CH_2CH_2O)_x$—$(CH_2CH(CH)O)_yH$], and m and n (in Structure V) range from 1 to 5,000, preferably from 2 to 1,000. The dynamic viscosity of the silicone oil ranges from 2 to 300,000 centiPoise (cP, or $10^{-3}$ Pa·s), preferably from 10 to 50,000 cP, and more preferably from 300 to 10,000 cP.

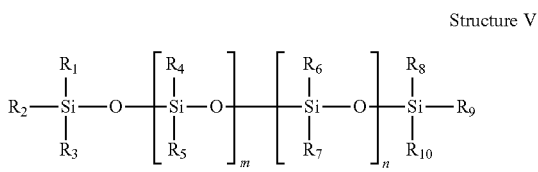

Structure V

The silicone oil used in the ice release coating preferably may also be a branched silicone of the following general structure VI, where m, n, and p (in Structure VI) range from 1 to 5,000, preferably 5 to 1000, and more preferably 10 to 100. The dynamic viscosity of the silicone oil ranges from 5 to 30,000 centiPoise (cP, or $10^{-3}$ Pa·s), preferably from 10 to 50,000 cP, and more preferably from 300 to 10,000 cP.

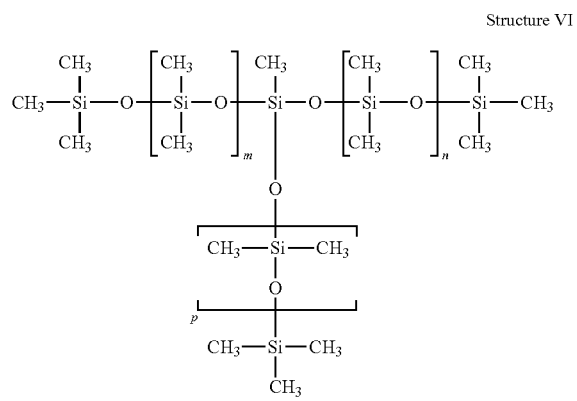

Structure VI

The silicone oil used in the ice release coating preferably may also be a branched silicone of the following general structure VII (as a more general structure of Structure VI), where $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, and $R_{16}$ can be chosen from $C_1$-$C_5$ alkyl, phenyl, benzyl, halide, hydride, fluoroalkyl [—$CF_3$], [—$CHF_2$], [—$(CH_2F)$], hydroxyl [—$(CH_2)_3H$], mercapto [—$(CH_2)_3SH$], halo [—$C_6H_4Cl$], carboxyl such as [—$(CH_2)_3$—$CH(COOH)$—$CH_2$—$COO$-alkyl], alkenyl such as [—$CH=CH_2$] and [—$(CH_2)$—$OOC$—$CH=CH_2$], amino such as [—$(CH_2)_3$—$NH$—$CH_2CH_2$—$NH_2$], isocyano such as [—$(CH_2)_3$—$OOC$—$NH$—$(CH_2)_4$—$N=C=O$], epoxy such as [—$(CH_2)_3$—$O$—$CH_2CH(O)CH_2$], or alkene oxide copolymer such as [—(CH$_2$)$_3$—O—CH$_2$CH$_2$O)$_x$—(CH$_2$CH(CH$_3$)O)$_y$H], and m, n, and p (in Structure VI) range from 1 to 5,000, preferably 5 to 1000, and more preferably 10 to 100. The dynamic viscosity of the silicone oil ranges from 2 to 300,000 centiPoise (cP, or 10$^{-3}$ Pa·s), preferably from 10 to 50,000 cP, and more preferably from 300 to 10,000 cP.

Structure VII

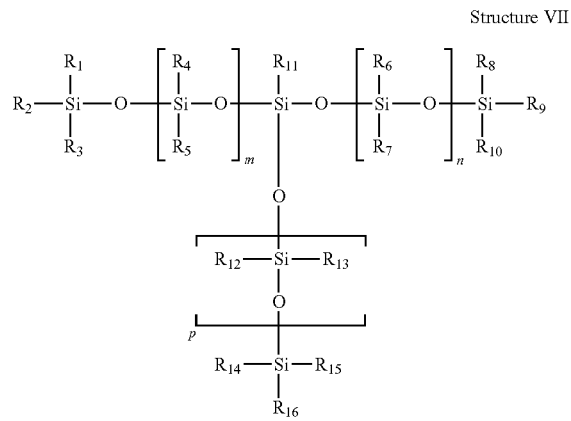

The silicone oil used in the ice release coating preferably may also be a cyclic siloxane of the following general structure VIII, where n ranges from 3 to 8, preferably from 3 to 5. The dynamic viscosity of the silicone oil ranges from 2 to 50 centiPoise (cP, or 10$^{-3}$ Pa·s), preferably from 2 to 20 cP, and more preferably from 2 to 10 cP. Such cyclic silicone oils are commercially available from companies such as Dow Corning, Wacker-Chemie, and Union Carbide.

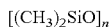 Structure VIII

The silicone oil used in the ice release coating preferably may be replaced or mixed with fluorosilicone fluids. The fluorosilicone fluids may have a molecular structure similar to those shown in Structures I, II, III, IV, V, VI, VII, and VIII but with any, some, or all of the hydrogen (H) atoms in those structures replaced by fluorine (F) atoms. One example is shown in the following structure.

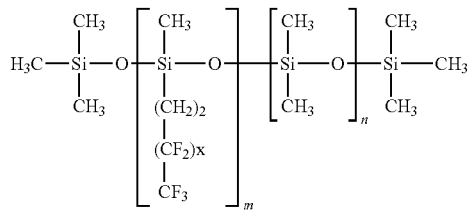

The silicone oils defined by structures I-VIII above preferably may be used in the coating composition either individually or in combination with each other. When the silicone oils are used in combination, the kinematic viscosity of the mixed silicone oil used in the ice release coating ranges from 2 to 30,000 centistokes (cSt, or 10$^{-6}$ m$^2$/s), preferably from 10 to 50,000 cSt, and more preferably from 300 to 10,000 cSt. The dynamic viscosity of the mixed silicone oil ranges from 2 to 30,000 centiPoise (cP, or 10$^{-3}$ Pa·s), preferably from 10 to 50,000 cP, and more preferably from 300 to 10,000 cP.

Silicone Resin

The silicone resin in the ice release coating preferably is a three dimensional polymer matrix, typically formed by crosslinking a trifunctional siloxane with other trifunctional siloxanes or difunctional siloxanes, and is typically described by structure IX shown below. Such silicone resins are commercially available from companies such as Dow Corning, Wacker-Chemie, Air Products, and Union Carbide. Such silicone resins are also contained in most silicone-based coatings, and these silicone-based coatings preferably may be used as the source of silicone resin in the ice release coating of the present disclosure. These silicone-based coatings are typically formulated as either 1-component or 2-component coatings. The silicone resin may be cross-linked during the curing process. These silicone-based coatings are commercially available from companies such as PPG Industries, Sherwin-Williams, Valspar, and Minwax.

Structure IX

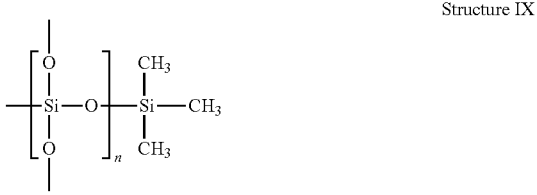

Combination of Silicone Oil with Silicone Resin

According to preferred embodiments of the present disclosure, an effective ice release coating that can function long term comprises silicone oil disposed or stored within the cross-linked silicone resin matrix, where the silicone oil will be released gradually to the surface of the silicone resin over time.

A preferred embodiment of an ice release coating according to the present disclosure has a weight ratio of the silicone oil to silicone resin that is greater than 1. In other words, the weight percentage of the silicone oil in the coating ranges from 50 to 99, and the weight percentage of the silicone resin ranges from 1 to 50. Various percentages of silicone oil and silicone resin in between may be used. The optimum weight ratio of the silicone oil to the silicone resin is determined by the nature and the composition of the oil and the resin. An effective range of performance is typically obtained with the weight ratio of the silicone oil to the silicone being from 1 to 20, preferably 1 to 10, and more preferably 2 to 8.

Optionally, the mixture of silicone oil and silicone resin preferably may be further diluted by suitable solvents, such as alcohols, esters, ethers, ketones, ether-alcohols, aromatic hydrocarbons, aliphatic hydrocarbons, halogenated hydrocarbons, and volatile silicones.

Optionally, other components preferably may be added to the coating formula, for example, to aid the application of the coating to various substrates, to improve the ultra-violet (UV) resistance, and to change the appearance of the coating. These components include solvents, flow additives, UV blockers, pigments and particles, and organic dyes. They are known to those skilled in the art, and can be added to the coating formula either individually or in combination with each other as long as they do not change the function of the silicone oil and the silicone resin used in the ice release coating.

In preferred cases according to the present disclosure where commercial silicone-based coatings, in either one-component or two-component formulations, are used as the source for silicone resin and/or silicone oil, the weight ratio of the silicone oil to the silicone resin needs to be calculated based on the weight of the oil and the resin in the mixture (excluding solvents, additives, and other compositions in the coating). Additional silicone resin and/or silicone oil may be added to the commercial silicone based coating to adjust the final weight ratio of silicone oil to silicone resin according to the present disclosure.

In cases that the silicone-based coating is formulated in an aqueous phase, the silicone oil preferably may be added to the silicone-based coating in an emulsion form. The silicone oil preferably may also be encapsulated in vesicles and mixed with the silicone resin.

The mixture of silicone resin and silicone oil formulated according to the present disclosure may be added to other coating formulas such as commercial paints to make ice release coatings which function according to the present disclosure.

The formulated mixture of silicone oil, silicone resin, and other optional components preferably may be applied to a substrate (including metals, metal oxides, glass, ceramics, wood, plastics, concretes, and substrates that have been pre-coated with varied types of coatings) by a variety of techniques such as spraying, brushing, roller, dip coating, spin coating, wire coating, and the alike.

Examples

The following examples are intended to illustrate the present disclosure and should not be construed as limiting the present disclosure in any way.

Example I

An ice release coatings was made by the following procedure. 100 parts by weight of hydroxy-terminated polydimethylsiloxane (viscosity: ~750 cP, Sigma-Aldrich), 200 parts by weight of fluorosilicone oil with a viscosity of ~300 cP at 25° C. (Mw: ~120,000, Sigma-Aldrich), 10 parts by weight of methyltris(2-methoxyethoxy)silane (Sigma-Aldrich), and 0.1 parts by weight of Dabco® T-12 catalyst (Air Products & Chemicals) were mixed together at room temperature and degassed. The coating was applied to aluminum panels by a spray gun or by brush.

Example II

Figure 2:
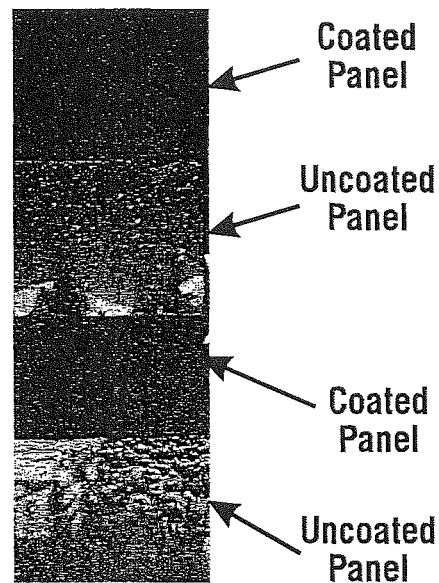
FIG. 2 is an optical image of 2 coated aluminum panels coated with a preferred ice release coating of the present disclosure and of 2 uncoated aluminum panels, all after being exposed to simulated freezing rain for 30 min. It was observed that the uncoated panels were covered by a thick layer of ice, while the coated panels had little ice on the surface—only ice islands at the bottom edge of the coated panels were observed which appeared to be in the process of slipping off the surface.

The aluminum panels coated in Example I were placed in an artificial freezing rain chamber (FIG. 1) with uncoated aluminum panels. Both the coated and uncoated panels were exposed to a fine vertical water spray equivalent to freezing drizzle. The temperature of the chamber was kept at –20° C. Water was introduced into the nozzle at about 2° C., which was about 1.8 m above the aluminum panel. The panel was tilted at about 20° to the horizontal for ice to slip off by gravity. FIG. 2 shows an optical image of 2 coated and 2 uncoated aluminum panels after being exposed to simulated freezing rain for 30 min. It was observed that the uncoated panels were covered by a thick layer of ice, while the coated panels had little ice on the surface-only ice islands at the bottom edge of the coated panels were observed which appeared to be in the process of slipping off the surface.

The amount of ice accumulated on the coated and uncoated panels was determined from the difference in weight before and after icing. Ice accumulation reduction factor (IARF) was measured, which is defined by the following equation:

Ice Accumulation Reduction Factor (IARF)=(Mean ice mass on bare aluminum)/(Mean ice mass on the coated aluminum)

IARF was measured to be greater than 40 for the coating made in this example.

Example III

An ice release coatings was made by the same procedure as in Example I, except that the fluorosilicone oil with a viscosity of ~300 cP at 25° C. was replaced with a fluorosilicone oil with a viscosity of ~8,000 cP at 25° C.

Example IV

Figure 3:
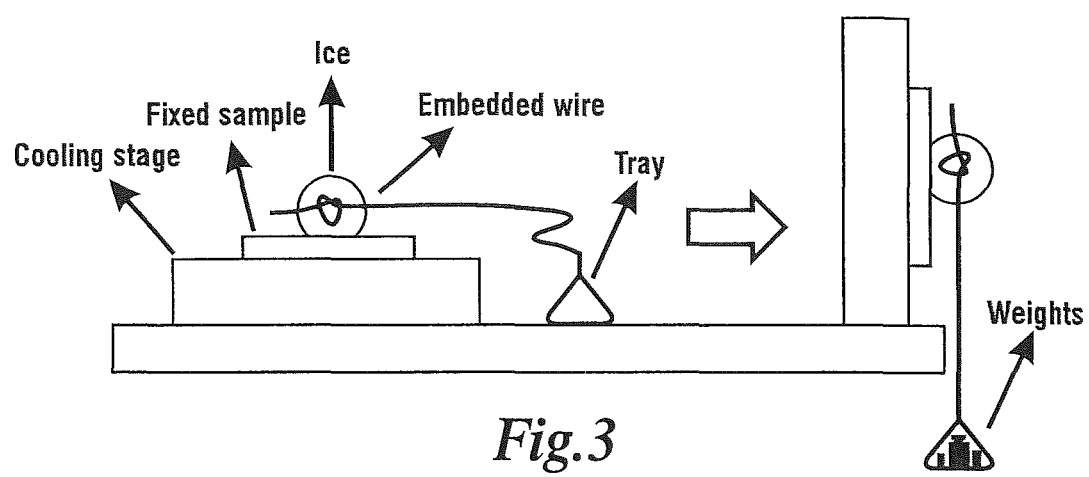
FIG. 3 is a schematic setup for measuring ice adhesion strength of preferred ice release coatings of the present disclosure.

This example measures the ice adhesion strength to the ice release coating made in Example III by using a setup schematically shown in FIG. 3. Briefly, an aluminum panel coated with the ice release coating was placed onto a cold plate. A water droplet was placed on the coating. A nylon wire with a tie on its end and a tray on another end was carefully inserted into the water droplet. The whole setup was placed into a cold chamber at –20° C. and the cold plate was also cooled to –20° C. The water droplet froze with the wire embedded inside the ice. Then both the sample and the cold plate were rotated 90 degree to the horizontal, and weights were gradually added to the tray until ice started to slip off the surface. The ice adhesion strength was then calculated based on the weight needed to move the ice and the contact area between ice and the substrate. This method was used to measure the ice adhesion strength of the ice release coating made in Example III, which was compared to the ice adhesion strength of 3 commercially available coatings: DuPont™ Teflon coating, Wearlon Super F-1 Icephobic coating, and Dow Corning Sylgard 184 Silicone. The results are shown below in Table I. When the coating made in Example III was used in this test, ice was observed to slip off spontaneous (due to the weight of ice) without adding any weight. Therefore, the ice adhesion strength was determined to be less than 2 kPa based on the weight of the ice alone.

TABLE I

Comparison of ice adhesion strength between 3 commercially available coatings and the coating made in Example III.

| Coatings | Stress needed to detach ice (kPa) |
| --- | --- |
| DuPont ™ Teflon Coating | ~90.5 |
| Wearlon Super F-1 Icephobic Coating | ~50 |
| Dow Corning Sylgard 184 Silicone | ~140 |
| Ice Release Coating Made in Example III | <2 |

Example V

This example examines the ice release performance of the coating made in Example III under repeated release cycles. The coatings were tested by repeated icing-and-release cycles. In each cycle, ice was formed on the coating and released while the ice adhesion strength was measured as described in Example IV. The ice adhesion strength remained less than 2 kPa and ice spontaneous slipped off the coating after up to 50 cycles.

Example VI

An ice release coatings was made by mixing 75 w.t. % of a silicone oil (with a molecular structure defined by Structure I where R is a methyl group and a dynamic viscosity of 500 cP) with 25 w.t. % of a silicone resin (with a molecular structure defined by Structure IX). The coating was applied to aluminum panels by a spray gun.

Example VII

This example examines the ice release performance of the coating made in Example VI by using a centrifuge adhesion test (CAT). The test consists of a two-step procedure where the extremity of bare and coated small beams are iced in a cold room and then rotated in a centrifuge to evaluate ice adhesion. In the first step, the extremity of bare and coated small beams (32 mm wide, 340 mm length, and 6 mm thick aluminum bar) was iced in a freezing drizzle in a climatic chamber at −8.0±0.2° C. and about 72% relative humidity. Ice was formed on a surface of about 1100 mm$^2$ area with a thickness of around 8 mm. The water droplets of the freezing drizzle have a median volumetric diameter of 110 m. To measure the ice adhesion strength of coatings, the coating was applied on an area covering at least 3200 mm$^2$ at one extremity of the beam. Prior to the second step following icing, the iced beams were left in a climatic chamber at −10.0±0.2° C. for one hour. In the second step, the iced beams were spun at an accelerating speed of ~300 rpm/s$^2$. The detachment of ice was monitored by piezoelectric cells on the centrifuge cover, and the rotation speed at the ice detachment was recorded. The apparent ice adhesion strength was measured as the bulk shear stress ($\tau$) needed to detach ice from the beam, which was calculated using the beam speed of rotation ($\omega$) at the ice detachment, the mass of ice (m), the beam radius (r) and the ice detachment area (A) according to $\tau=(mr\omega^2)/A$. For each substrate, 3 tests were conducted and the average of the three results was reported. The average ice adhesion strength for the ice release composition of Example VI was measured to be 9.2±1.3 kPa.

Example VIII

This example examines the effect of the silicone oil's viscosity on the ice release performance of the coating. As a comparison to the coating made in Example VI, another two coatings were made by the same method as described in Example VI with the only exception that the viscosities of the silicone oils used in these two coatings were different from that (500 cP) of the silicone oil used in Example VI. The dynamic viscosities of the two silicone oils used in these two coatings were 0.6 cP and 60,000 cP, respectively. Ice adhered to both coatings with adhesion strength of greater than 50 kPa.

While the present disclosure has been described in detail and with reference to specific embodiments thereof, it will be apparent to one skilled in the art that various changes and modifications can be made therein without departing from the spirit and scope of the embodiments. Thus, it is intended that the present disclosure cover any such modifications and/or variations provided they come within the scope of the appended claims and their equivalents.

What is claimed is:

1. A composition consisting of, by weight, 75% polydimethylsiloxane (PDMS) infused in 25% cross-linked silicone resin matrix; wherein the PDMS has a dynamic viscosity of 200 cP and the silicone resin matrix comprises a three dimensional polymer matrix comprising a trifunctional siloxane crosslinked with one or more other trifunctional siloxanes or difunctional siloxanes.

* * * * *